Oct. 1, 1929.　　　H. R. CURME　　　1,729,711
PARTIAL OXIDATION OF GASEOUS HYDROCARBONS
Filed April 26, 1922
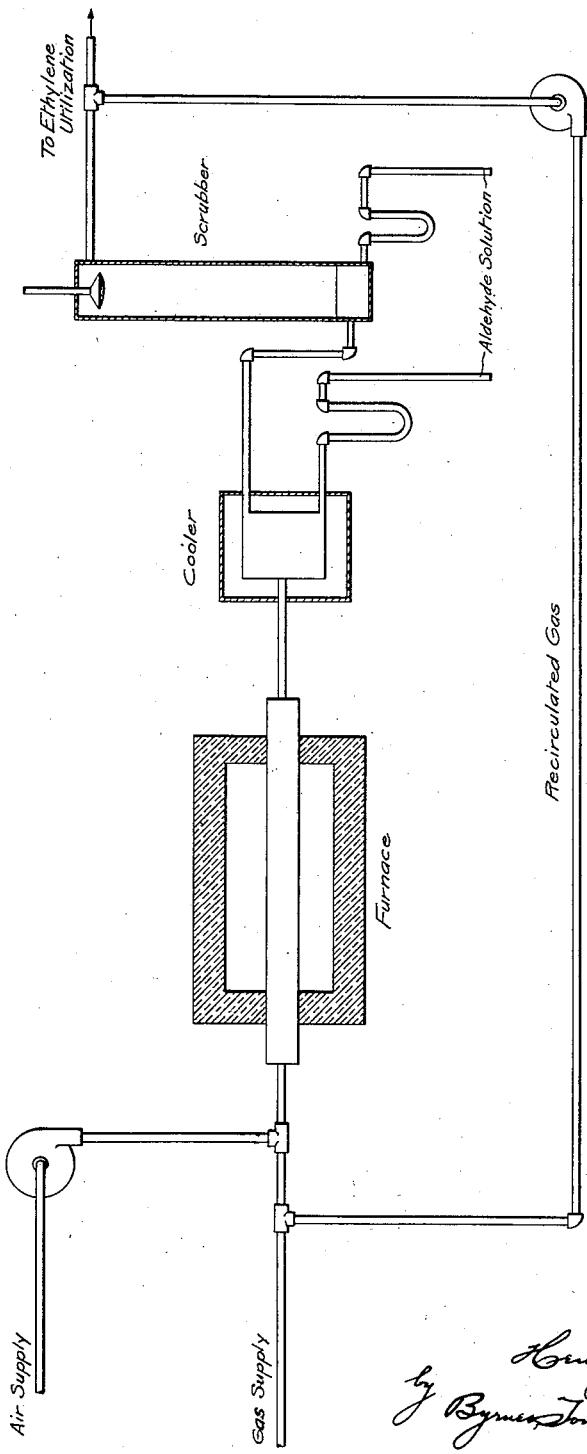

Patented Oct. 1, 1929

1,729,711

UNITED STATES PATENT OFFICE

HENRY R. CURME, OF CLENDENIN, WEST VIRGINIA, ASSIGNOR TO CARBIDE & CARBON CHEMICALS CORP., A CORPORATION OF NEW YORK

PARTIAL OXIDATION OF GASEOUS HYDROCARBONS

Application filed April 26, 1922. Serial No. 556,699.

It has long been known that when hydrocarbons are burned under some conditions, for example when the supply of oxygen is restricted and the combustion products are rapidly cooled, there may be formed oxygenated compounds containing both carbon and hydrogen, such as formaldehyde. This observation has given rise to the hope that an industrial process for the preparation of such oxygen compounds might be based thereon, and many proposals directed toward this end have been put forth. Efforts along this line have been concentrated on the preparation of formaldehyde, since this compound has many uses and since its simple chemical structure indicates that its preparation should be attended with less difficulty than the production of more complex oxygen compounds, such as the alcohols, aldehydes and acids having a plurality of carbon atoms in the molecule.

As methane is very abundant, occurring in highly concentrated form as natural gas, and since, like formaldehyde, it has but one carbon atom in its molecule, this hydrocarbon has so universally been regarded as the most promising material from which to make formaldehyde by direct oxidation that it has occupied the field to the practical exclusion of all other hydrocarbons.

None of the proposals which involve the use of methane as starting material have been commercially successful. It is known that methane is a remarkably stable substance and that relatively high temperatures are required to introduce an oxygen atom into its molecule: it is also known that formaldehyde is unstable at the lowest temperatures at which methane can be oxidized at an acceptable rate and is increasingly unstable at higher temperatures, but the attempts to overcome this disadvantageous relationship have taken the form of efforts to bring the reaction temperatures into more favorable ranges, and little or no attention has been given to the possibility of using a hydrocarbon which is oxidized at a lower temperature.

While the partial oxidation of ethane has been proposed by Glock in German Patent 109,015, the fact that he recommends for the process exactly the same temperatures, catalysts and other conditions that he found to be suitable for methane, shows that his knowledge of the behavior of ethane was exceedingly limited. This is made still more apparent by his statement that the reaction products are compounds having two carbon atoms in the molecule, namely ethyl alcohol, acetaldehyde and acetic acid. Glock's statements have doubtless retarded rather than advanced the art, since acceptance of his statements leads to the conclusion that methane is much to be preferred as a starting material. As ethane is much less abundant than methane, Glock's failure to observe any more favorable behavior in the case of ethane has apparently been sufficient to deter subsequent investigators from attempting to operate on ethane and its higher homologues.

It has also been proposed to produce aldehydes by the partial oxidation of ethylene, either pure or in mixtures such as the gases resulting from the destructive distillation of coal, wood and the like. These mixtures may contain methane, ethane and other saturated hydrocarbons, but it is clearly to be understood that those who have devised processes for making aldehydes from such mixtures contemplated only the utilization of the ethylene present and so regulated the operating conditions that methane and ethane would not be attacked.

I have found that ethane may be partially oxidized at a temperature about 100° C. below that required for methane, and the partial oxidation of ethane at this low temperature can be so regulated that oxygenated carbon-hydrogen compounds having a single carbon atom in the molecule can be formed, if desired, in much greater proportion than the two carbon atom compounds mentioned by Glock. Formaldehyde can be produced with the greatest facility by the partial oxidation of ethane, and because of the lower temperature at which it is formed from ethane, a concentration of formaldehyde can be obtained in the reaction products which is ten to twenty times as great as is possible when working with methane.

In addition to the advantages mentioned above, I have discovered other results which follow the use of ethane instead of methane as starting material, these results being in themselves sufficient to warrant the choice of ethane. I have found that while a portion of the ethane is being converted to oxygenated compounds, another portion is converted to ethylene, a compound of recognized commercial value because of its great chemical reactivity. It is known that ethane and paraffin hydrocarbons of higher molecular weight may be partially transformed into olefines by simple heating, but if the heating is carried out in the presence of regulated oxidizing influences, a good yield of olefines is obtained at a temperature which is lower by 150° C., and the reaction product, in addition to carrying valuable oxygenated bodies, is characterized by freedom from benzene and unsaturated polymerization products of high molecular weight, for example diolefines and tar, which interfere seriously with the usual methods of utilizing olefines, such as absorption in acid.

A simple method of producing the oxidizing influences required to produce oxygenated carbon-hydrogen compounds from paraffin hydrocarbons such as ethane, comprises admixing with the paraffin passing to the heated reaction zone, a certain proportion of oxygen or air. Of these, I prefer air, as I find that the dilution of the reaction mixture brought about by the nitrogen is of favorable influence on the reaction. A proportion of nitrogen even higher than that which would result from the admixture of the optimum quantity of oxygen as air, is desirable in many cases. The following specific example will serve further to illustrate the process when air is the oxidizing agent employed, reference being had to the accompanying diagrammatic drawing.

Ethane was mixed with air in the proportion of one volume of ethane to two of air, and the mixture passed through a hot silica tube at the rate of 27 liters per hour. The tube was one-half inch in diameter and was heated to 700°—710° C. over a length of about two feet. The exit gas was cooled in a vessel surrounded with ice, and was then scrubbed with cool water. The exit gas was divided into two portions, one portion being returned to the furnace with the fresh mixture passing thereto. In the run referred to, about ten volumes of the exit gas were so recirculated for one volume of the fresh mixture.

A liquid which condensed and collected in the cooler was found to be an aqueous solution of formaldehyde. More formaldehyde and some acetaldehyde were removed in the scrubber. Part of the water collected in the cooler and all of the aldehydes were products of the oxidation of the ethane. The formaldehyde content of the liquid from the cooler was about 10%, and the formaldehyde was formed in the amount of about 8.5 pounds, calculated as anhydrous $CH_2O$, per thousand cubic feet of ethane treated, 1.4 pounds of acetaldehyde being produced simultaneously. About 60%—70% of the total formaldehyde produced appeared in the cooler, the rest being separated in the scrubber.

Analysis of a sample of the exit gas from the system showed the following composition:

|  | Per cent |
|---|---|
| Carbon dioxide | 0.7 |
| Ethylene | 9.9 |
| Oxygen | 1.7 |
| Hydrogen | 6.2 |
| Carbon monoxide | 6.2 |
| Methane | 0.7 |
| Ethane | 13.7 |
| Nitrogen (by difference) | 60.9 |
|  | 100.0 |

The exit gas was free from benzene, diolefines and tar, and was therefore in condition for the utilization of its ethylene content, as by absorption in acid, without further treatment. Absorption of the ethylene in acid leaves a residue containing considerable ethane, which can be returned to the heating stage. Undue increase of the nitrogen concentration may be prevented by using oxygen instead of air to make up the mixture passing to the furnace.

The following tabulation, based upon the results of the above specific example, shows the yield of various products. Of the ethane fed to the furnace, the amount converted to various products is set down opposite their names:

|  | Per cent |  |
|---|---|---|
| Carbon dioxide | 1.2 |  |
| Carbon monoxide and hydrogen | 10.5 |  |
| Methane | 1.2 |  |
|  |  | 11.7 |
| Ethylene | 33.4 |  |
| Aldehydes | 7.4 |  |
|  |  | 40.8 |
| Unchanged ethane | 46.3 |  |
|  |  | 100.0 |

Accordingly, 40.8% of the ethane treated was converted into highly useful products, 46.3% was unchanged, 11.7% was converted into substances having a fuel value, while only 1.2% went to useless products.

The dilute solution containing both formaldehyde and acetaldehyde which is produced in some modifications of my invention, may be utilized without further treatment, or the aldehydes may be separated in the form of suitably concentrated aqueous solutions, aldehyde compounds and the like.

Propane, butane or a higher paraffin, or a mixture of paraffins, may be used instead of ethane with similar results, the essential difference in the reaction products then obtained consisting in the presence therein of those olefines of higher molecular weight than ethylene, though oxygenated bodies of higher molecular weight than acetaldehyde are also formed to some extent. Formaldehyde and ethylene may be abundantly produced, if desired, even with these higher paraffin hydrocarbons. In certain cases, a material in which a single paraffin hydrocarbon having a plurality of carbon atoms in its molecule predominates is the preferred raw material for my process, while in other cases, a mixture containing significant quantities of each of a plurality of paraffins is preferred. In general it may be said that the facility with which the paraffin hydrocarbons react, increases with their molecular weight. When the paraffins are obtained from certain sources, for example natural gas, the quantities of particular paraffins available will usually decrease as their molecular weights increase. These considerations, as well as the products desired, will determine the composition of the raw material to be used. The presence of methane in the mixture passing to the furnace is not precluded, but it acts primarily as a diluent and is not much changed in the process.

My process is applicable to gas mixtures initially containing olefine hydrocarbons, provided there is also present a sufficient content of paraffin hydrocarbons of higher molecular weight than methane. When such mixtures, of which coke oven gases are an example, are treated in accordance with my invention, the result is totally different from that observed in prior treatments of such mixtures, in that there is a utilization of the paraffins as well as the olefines for the production of oxygenated bodies, and in that there is a further utilization of paraffin hydrocarbons for the production of hydrocarbons of lesser hydrogen content.

With the rates and dimensions given in the specific example, a molecule of the mixture passed through the furnace in a little less than one second. A similar effect is obtained with a longer tube and a corresponding higher rate of flow. The temperature used (700° C.–710° C.) is about 150° C. less than the optimum temperature for the pyrolytic decomposition of ethane in the absence of oxidizing influences, as mentioned above. Other temperatures, varying, for example, from 620° C. to 850° C. when ethane is being treated, with the time of exposure preferably varying inversely with the temperature, have been used with good results.

It will be noted that the reactions contemplated herein yield, as direct or indirect products of the oxidation of hydrocarbons, both other hydrocarbons of lesser hydrogen content (such as olefines), and oxygenated bodies such as aldehydes. By properly controlling the operating conditions, it is readily possible to facilitate either one of these transformations. For example, instead of recirculating gases in such manner as to obtain a high yield of aldehyde, as described above, my invention contemplates also a treatment of the gases under optimum conditions for the production of an olefine, as for example ethylene, the effluent gas being then treated in any appropriate way for the separation and recovery of its aldehyde content. Such treatment may comprise scrubbing with water, as described above, or any other appropriate solvent for an aldehyde, such as a solution of a bisulfite; or the introduction into the system of any reagent, for example ammonia or an ammonium compound, which will combine with the aldehyde with the production of non-volatile bodies of the hexamethylene or methylene-ammonia type, aldehyde-ammonia, or the like.

In so far as I have investigated the action of known catalysts, such as the heavy metals or their compounds, I have found them to be useless and in most cases detrimental in connection with my invention. The best results have been obtained when the reaction mixture has been excluded from contact with all metals while at an elevated temperature, and for this reason a silicious or vitreous heating surface is preferred. The best heating surface of which I have knowledge is one composed of substantially pure silica.

I do not wish to restrict myself to any particular method of producing the oxidizing influences in the presence of which the decomposition of the paraffin hydrocarbon takes place. My invention possesses broadly novel aspects in its appreciation of the great superiority of those paraffins which are of higher molecular weight than methane as sources of oxygenated compounds, and in its appreciation of the improvement which is brought about in pyrolytic decomposition of paraffin hydrocarbons, even though regarded only as a method of producing olefines, by the presence of oxidizing influences. Based on these conceptions, my invention may doubtless be embodied in various processes involving the various known ways of producing oxidizing influences. Such processes as fall within the appended claims, whether employing free or initially combined oxygen, and whether or not they make use of catalysts or other accelerators, I regard as my invention.

I claim:—

1. Process which comprises mixing an excess of hydrocarbon material containing a preponderance of normally gaseous paraffine hydrocarbon of greater molecular weight than methane with an oxidizing gas; heating the mixture to a temperature above 600° C. in contact with vitreous material only and under such conditions that formaldehyde is formed and persists therein; separating said aldehyde from the mixture; and reheating the mixture so produced to form an additional quantity of said oxygenated compound.

2. Process which comprises mixing a hydrocarbon material containing a normally gaseous paraffine hydrocarbon having a plurality of carbon atoms in its molecule with an oxidizing gas, the latter in insufficient quantity for the complete oxidation of the hydrocarbon material to ultimate oxidation products; heating the mixture in the absence of catalysts to a temperature above 600° C. to produce formaldehyde from said paraffine hydrocarbon; and recovering the formaldehyde.

3. Process which comprises mixing a hydrocarbon material containing a normally gaseous paraffine hydrocarbon having a plurality of carbon atoms in its molecule with an oxidizing gas, the latter in insufficient quantity for the complete oxidation of the hydrocarbon material to ultimate oxidation products; heating the mixture in the absence of catalysts to a temperature above 600° C. to produce aldehyde from said paraffine hydrocarbon; and recovering the aldehyde.

4. Process which comprises mixing a hydrocarbon material containing a preponderance of normally gaseous paraffine hydrocarbons of greater molecular weight than methane with an oxidizing gas, the latter in insufficient quantity for the complete oxidation of the hydrocarbon material to ultimate oxidation products; heating the mixture in the absence of catalysts to a temperature above 600° C. to produce formaldehyde; condensing the latter; and heating the gaseous residue to produce additional formaldehyde.

5. Process which comprises mixing a hydrocarbon material containing a preponderance of normally gaseous paraffine hydrocarbons of greater molecular weight than methane with an oxidizing gas, the latter in insufficient quantity for the complete oxidation of the hydrocarbon material to ultimate oxidation products; heating the mixture in the absence of catalysts to a temperature above 600° C. to produce formaldehyde; condensing the latter; and heating the gaseous residue with a portion of the original mixture to produce additional formaldehyde.

6. Process which comprises mixing oxygen with a hydrocarbon material containing a preponderance of normally gaseous paraffine hydrocarbons of greater molecular weight than methane, the oxygen being present in insufficient quantity for the complete oxidation of the hydrocarbon material to ultimate oxidation products; heating the mixture in the absence of catalysts to a temperature above 600° C. to produce aldehyde, and recovering the latter.

7. Process which comprises mixing oxygen with a hydrocarbon material containing a normally gaseous paraffine hydrocarbon having a plurality of carbon atoms in its molecule, the oxygen being present in insufficient quantity for the complete oxidation of the hydrocarbon material to ultimate oxidation products; heating the mixture in the absence of catalysts to a temperature above 600° C. to produce formaldehyde from said paraffine hydrocarbon; and recovering the latter.

8. Process which comprises mixing oxygen with a hydrocarbon material containing a normally gaseous paraffine hydrocarbon having a plurality of carbon atoms in its molecule, the oxygen being present in insufficient quantity for the complete oxidation of the hydrocarbon material to ultimate oxidation products; heating the mixture in the absence of catalysts to a temperature above 600° C. to produce formaldehyde from said paraffine hydrocarbon; separating the formaldehyde; and heating the gaseous residue to produce additional formaldehyde.

In testimony whereof, I affix my signature.

HENRY R. CURME.